United States Patent
Abraham et al.

(10) Patent No.: US 7,127,592 B2
(45) Date of Patent: Oct. 24, 2006

(54) METHOD AND APPARATUS FOR DYNAMICALLY ALLOCATING REGISTERS IN A WINDOWED ARCHITECTURE

(75) Inventors: Santosh G. Abraham, Pleasanton, CA (US); Yuan C. Chou, Mountain View, CA (US)

(73) Assignee: SUN Microsystems, Inc., Santa Clara, CA (US)

( * ) Notice: Subject to any disclaimer, the term of this patent is extended or adjusted under 35 U.S.C. 154(b) by 515 days.

(21) Appl. No.: 10/338,548

(22) Filed: Jan. 8, 2003

(65) Prior Publication Data

US 2004/0133766 A1    Jul. 8, 2004

(51) Int. Cl.
*G06F 9/00* (2006.01)
(52) U.S. Cl. .................... 712/217; 712/228
(58) Field of Classification Search ........... 712/217, 712/228
See application file for complete search history.

(56) References Cited

U.S. PATENT DOCUMENTS

| | | | | |
|---|---|---|---|---|
| 5,642,523 A | * | 6/1997 | Sakaue | 712/41 |
| 5,758,112 A | * | 5/1998 | Yeager et al. | 712/217 |
| 5,941,977 A | * | 8/1999 | Panwar et al. | 712/23 |
| 5,987,596 A | * | 11/1999 | Walker | 712/217 |
| 6,314,511 B1 | * | 11/2001 | Levy et al. | 712/217 |
| 6,341,347 B1 | * | 1/2002 | Joy et al. | 712/228 |
| 6,675,288 B1 | * | 1/2004 | Farrell et al. | 712/216 |
| 6,772,317 B1 | * | 8/2004 | Jourdan et al. | 712/217 |
| 6,889,319 B1 | * | 5/2005 | Rodgers et al. | 712/228 |

OTHER PUBLICATIONS

Russell, Gordon and Shaw, Paul. "Shifting Register Windows." IEEE Micro Aug. 1993, pp. 28-35.*
Mayhew, David, Tront, Joseph. "Overlapping Register Windows with Transparent Spill and In-Line Subroutine Expansion." IEEE 1987, pp. 627-630.*

* cited by examiner

*Primary Examiner*—Eddie Chan
*Assistant Examiner*—Jacob Petranek
(74) *Attorney, Agent, or Firm*—Park, Vaughan & Fleming, LLP; Edward J. Grundler

(57) ABSTRACT

One embodiment of the present invention provides a system that dynamically allocates physical registers in a windowed processor architecture. The system includes a physical register file and a register map that maps architectural registers defined within an executing program to physical registers within the physical register file. The system also includes a window allocation mechanism that allocates a new name space for a register window without allocating physical registers for the register window, thereby allowing the physical registers to be dynamically allocated as needed instead of being allocated at window initialization time.

25 Claims, 4 Drawing Sheets

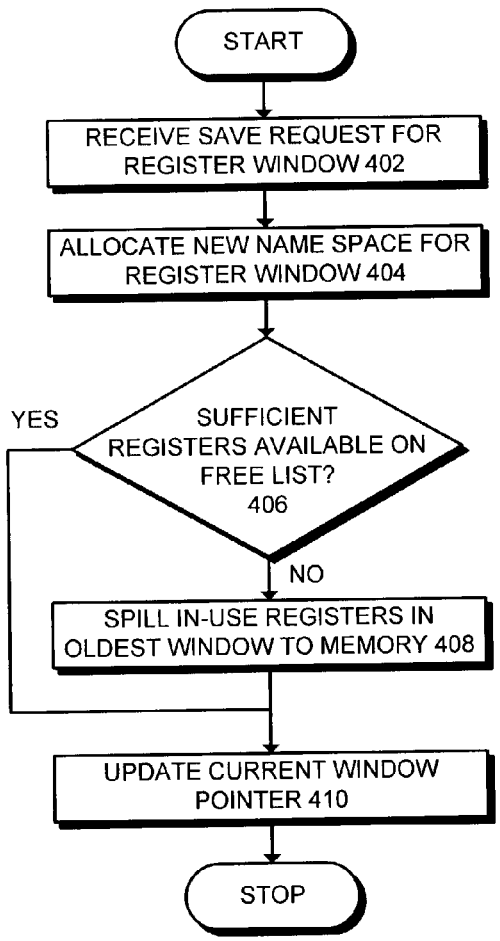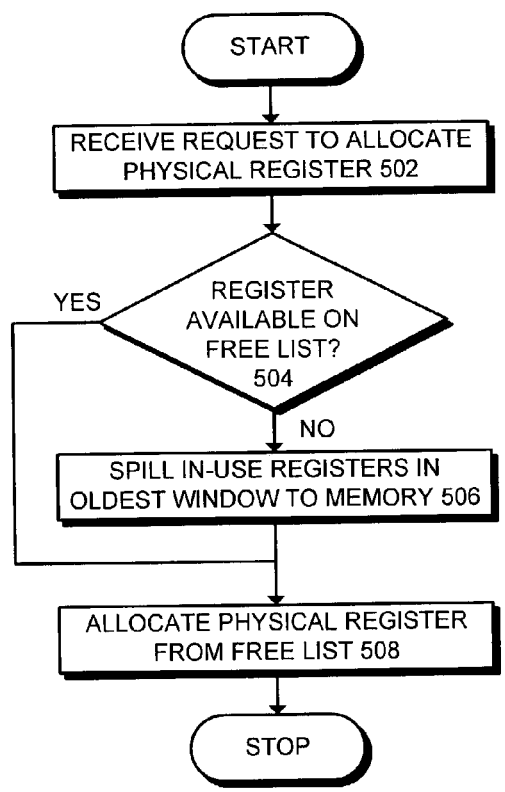
FIG. 4
FIG. 5

METHOD AND APPARATUS FOR DYNAMICALLY ALLOCATING REGISTERS IN A WINDOWED ARCHITECTURE

BACKGROUND

1. Field of the Invention

The present invention relates to the design of processors within computer systems. More specifically, the present invention relates to a method and an apparatus for dynamically allocating physical registers in a windowed processor architecture.

2. Related Art

Computer systems typically perform computational operations on data values stored in a set of processor registers. Because each function within a program operates on its own set of registers, a processor's "active register set" changes each time the current function changes, for example during a function call operation or a function return operation. This change can involve saving the current register set to memory during a function call operation to make room for a register set for the new function, and subsequently restoring the current register set from memory during a corresponding function return operation. Unfortunately, this process of saving and restoring register sets to memory is extremely time-consuming and can significantly degrade computer system performance.

Modern computer architectures sometimes make use of a large set of registers to reduce the time required to perform save and restore operations. This large set of registers is typically divided into a number of "register windows," wherein each register window contains the register set for a different function on the call stack. This makes it possible to simply switch between register windows during a function call operation, instead of having to save and restore registers to memory.

For example, the SPARC™ V9 instruction set defines an integer general-purpose architecture comprised of an implementation-dependent number of overlapped register windows. At any time, only a small fraction of the register windows is visible to application software. Compared to other reduced instruction set computer (RISC) architectures that implement a flat register space of typically 32 integer registers, SPARC™ register windows decrease the overhead of register spilling and filling as described below. (SPARC™ is a registered trademark of SPARC International, Inc.™ of San Jose, Calif.) Note that the SPARC™ architecture is described for exemplary purposes only. This description in no way limits the present invention to the SPARC™ architecture.

Upon encountering a procedure call, SPARC™ code typically moves to a new register window using a save instruction. Conversely, on a procedure return, the SPARC™ code typically returns to the previous register window through a restore instruction. In contrast, on a typical RISC architecture, the registers are spilled by saving them to the stack in memory upon encountering the procedure call and restored from the stack through register fills on a procedure return. The overhead of register spilling and filling can be significant due to the additional load/stores executed, the additional memory traffic, and the expansion in the code footprint.

On the other hand, the primary disadvantage of register windows is that the register windows require a larger physical register file, which is slower and may be in the critical timing path of the processor pipeline. Register file access times do not scale as well as logic delays with improvements in process technology. Therefore, the large physical register file size required by register windows increasingly limits the processor frequency. As a result, the newer processor chips provide space for fewer register windows than in previous generation processor chips. Unfortunately, this reduced number of windows increases the number of costly window spills and restores. A register window is spilled to memory when the application attempts to use more than the number of windows supported by a processor implementation. Spilling a register window generally involves copying the registers used by an ancestor routine to a special buffer or software stack. The spilled register window may then be used for the current routine or procedures. Eventually, when the processor returns to the ancestor routine whose window was spilled, the processor restores or fills the window by copying an area in a special buffer or software stack back to the registers.

Furthermore, recent trends in object-oriented software programming have lead to applications with small procedures and deep runtime call graphs. Smaller functions may not fully utilize all the registers in a register window. Moreover, deep call graphs require frequent spilling of entire register windows when only a fraction of the registers actually contain live values. In order to support a reasonable number of register windows, say five, while still allowing for competitive processor clock frequencies, it is desirable to improve the implementation of register windows in future processor designs.

Note that modern processors typically implement out-of-order execution to enhance throughput. Out-of-order processors use register renaming to eliminate anti (write-after-read) and output (write-after-write) dependencies between instructions by allocating a fresh physical register on each definition of an architectural register encountered in the dynamic program order. Since multiple definitions of the same architectural register are written to distinct physical registers, the processor may reorder these multiple definitions without affecting the final outcome of the instructions.

In addition to a large physical register file, a common implementation of renaming uses a rename map that associates each architectural register with a corresponding physical register identifier. Furthermore, two other first-in-first-out (FIFO) structures are used to maintain the free list and pending list. A free list contains a list of physical register identifiers that are available to be assigned and a pending list contains a list of physical register identifiers that may be freed once all instructions that use (read) this physical register have retired. Typically, a physical register identifier is moved to the pending list upon a new definition of its associated architectural register. A physical register may be moved to the free list from the pending list once all instructions that read from that physical register have retired.

In a processor that implements register windows, the in-order rename stage in the front end first flattens all resister specifications by adding an offset based on the current window pointer. The current window pointer points to the window or set of windows currently accessible to application software. The current window pointer is typically updated by save and restore instructions. The rename stage uses the flattened architectural register identifier to look up the corresponding physical register in the rename map for each source register. For a destination register of an instruction, the rename stage then assigns a new physical register and records the assignment in the rename map. During this process, the rename stage removes the new physical register from the free list and pushes the previously assigned physical register onto the pending list. From this point onwards, instructions may be executed in an out-of-order fashion without regard to the original "anti" and "output" dependencies. The retire stage also operates in an in-order fashion recovering the resources that were allocated to an instruction. In particular, register identifiers may be moved from the pending list to the free list by the retire stage.

In some processor implementations, the physical register file is partitioned into an architectural register file and a working register file containing rename registers. In the rename stage, destination registers are allocated rename registers and these rename registers are copied back into the architectural register at retire. In alternative implementations, the physical register file is not partitioned and the retire unit does not have to copy a working register to an architectural register. In either type of implementation, during a save operation, the processor ensures that an entire window, of say 16 registers, is allocated, even if the function generates only 4 live registers in the window as is typical. Thus, a large fraction of the critical physical register file contains dead or unused registers. These dead registers are recovered by a subsequent restore instruction, but in the intervening period the window may potentially be spilled/filled multiple times. Hence, including these dead registers in the fill/spill operations unnecessarily increases the overhead of the spill and fill operations and thereby decreases throughput of the processor.

What is needed is a method and an apparatus that facilitates dynamically allocating physical registers in a windowed architecture without the problems described above.

SUMMARY

One embodiment of the present invention provides a system that dynamically allocates physical registers in a windowed processor architecture. The system includes a physical register file and a register map that maps architectural registers defined within an executing program to physical registers within the physical register file. The system also includes a window allocation mechanism that allocates a new name space for a register window without allocating physical registers for the register window, thereby allowing the physical registers to be dynamically allocated as needed instead of being allocated at window initialization time.

In a further variation, the system additionally includes an allocation mechanism that is configured to allocate a physical register within a register window in response to an allocation event. This allocation event can include a write to an unallocated register.

In a variation of this embodiment, the system includes a spill mechanism that spills allocated physical registers to memory from an oldest register window, if necessary, to free up physical registers.

In a further variation, the system includes a fill mechanism that fills registers from memory during a window underflow condition.

In a variation on this embodiment, the system additionally includes a free list of registers that identifies available registers within the physical register file and a pending list that identifies in-use registers within the physical register file.

In a further variation, the apparatus includes a restore mechanism that is configured to remove mappings of physical registers within a current window and to add the recovered physical registers to the free list.

In a further variation, the system includes a retire mechanism that is configured to move a register from the pending list to the free list when the register is no longer needed by the executing program.

In a further variation, the apparatus includes a live register vector that indicates which registers are allocated.

In a further variation, the apparatus includes a killreg instruction that removes mappings and recovers physical registers for registers within a register window that are no longer live.

In a further variation, the apparatus includes a hardware stack of rename maps with the current rename map at the top of this stack used to directly translate architectural register identifiers to physical register identifiers.

In a further variation, the rename map stack is popped/pushed respectively on a window deallocation/allocation event and the previous top of rename stack is used to update the new top of rename stack

BRIEF DESCRIPTION OF THE FIGURES

FIG. 4 is a flowchart illustrating the process of executing a save operation in accordance with an embodiment of the present invention.

FIG. 5 is a flowchart illustrating the process of allocating a physical register in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Central Processing Unit

Figure 1:
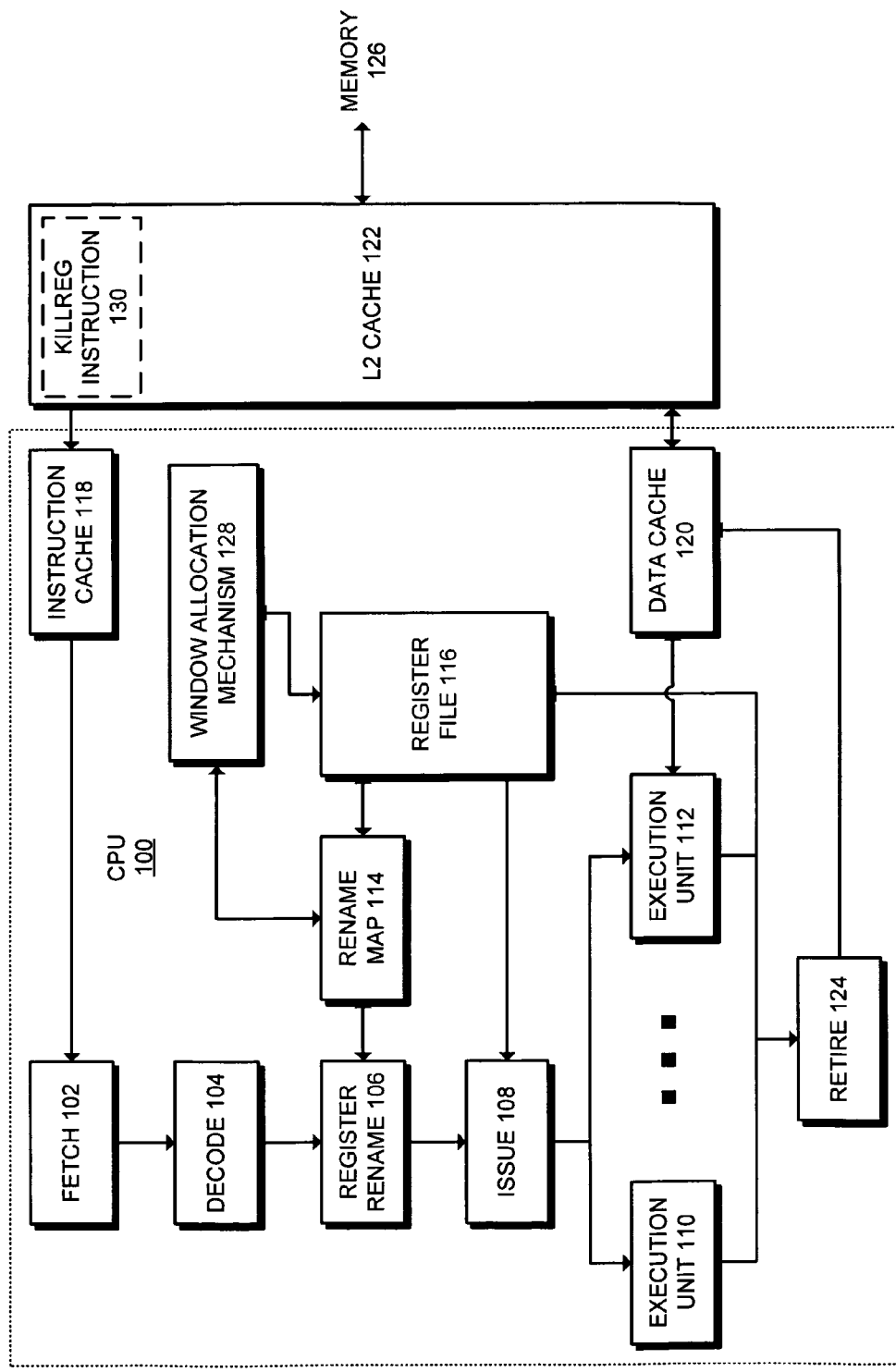
FIG. 1 illustrates a central processing unit in accordance with an embodiment of the present invention.

FIG. 1 illustrates a central processing unit (CPU) 100 in accordance with an embodiment of the present invention. CPU 100 includes fetch unit 102, decode unit 104, register rename 106, issue unit 108, execution units 110 and 112, rename map 114, register file 116, instruction cache 118, data cache 120, window allocation mechanism 128, and retire unit 124. CPU 100 is coupled to Level-2 (L2) cache 122, which is further coupled to memory 126.

During program execution, instructions and data from memory 126 are stored in L2 cache 122. A subset of instructions and data may also be copied to instruction cache 118 and data cache 120 respectively so that recently used instructions and data are readily available to central processing unit 100.

In order to execute instructions, fetch unit 102 fetches instructions from instruction cache 118. Decode unit 104 subsequently decodes the fetched instructions. Note that it is typical for many instructions to be "in-flight" through CPU 100 simultaneously.

Register rename 106 allocates registers from register file 116 and assigns these physical registers to architectural registers specified in the instructions. Rename map 114 maintains the mapping from architectural registers to physical registers for central processing unit 100. This process of mapping physical registers to architectural registers is discussed further below.

After the registers have been mapped, issue unit 108 receives the decoded instruction to be issued to an execution unit. Execution units 110 and 112 are representative of the execution units within central processing unit 100. Note that there may be more or fewer execution units than shown. These execution units are substantially identical, so only execution unit 112 will be described herein.

Execution unit 112 receives decoded instructions and register mappings from issue unit 108. Execution unit 112 then retrieves operands associated with the instructions from data cache 120 and register file 116. Execution unit 112 stores operation results within register file 116 and data cache 120.

Note that registers within register file 116 may or may not be mapped to an architectural register. Additionally, register file 116 can include registers, which are mapped to other processes and are not currently visible to execution unit 112.

Instructions

Figure 2:
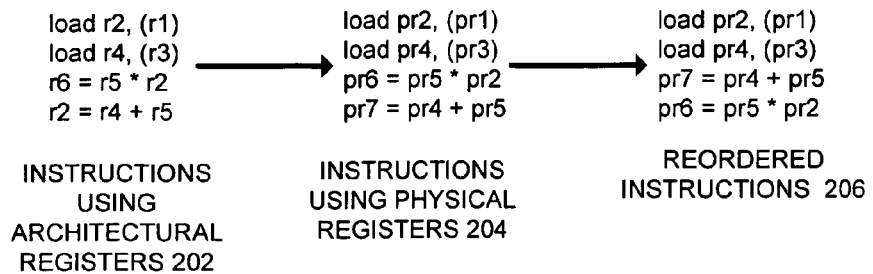
FIG. 2 illustrates instructions at various stages of processing in accordance with an embodiment of the present invention.

FIG. 2 illustrates instructions at various stages of processing in accordance with an embodiment of the present invention. The instructions using architectural registers 202 comprise an instruction stream as fetched from the instruction cache and input into register rename 106 that references architectural registers. Note that these architectural registers are identified as r1–r6.

The instructions using physical registers 204 comprise an instruction stream that references physical registers within register file 116 at the output of register rename 106. These physical registers are identified as pr1–pr7. Note that the last instruction in this stream uses pr7 in place of r2. The register rename 106 substitutes a distinct physical register identifier for each definition of an architectural register in the dynamic instruction stream and continues to use this physical register identifier for all subsequent uses of the architectural register in later instructions. In this example, there is an anti-dependence between the last two instructions in the stream, because a read of register r2 is followed by a write of register r2. Reordering these two instructions would cause the instruction r6=r5*r2 to use (incorrectly) the value of r2 computed by r2=r4+r5 instead of the correct value computed by load r2, (r1). Renaming this register to pr7 provides advantages, which are discussed below.

This set of reordered instructions 206 includes the same instructions as the instructions using physical registers 204. However, the final two instructions have been reordered. Since the instruction pr7=pr4+pr5 no longer destroys the value of r2, the instructions can be reordered to improve processing performance without causing erroneous results.

Data Structures

Figure 3:
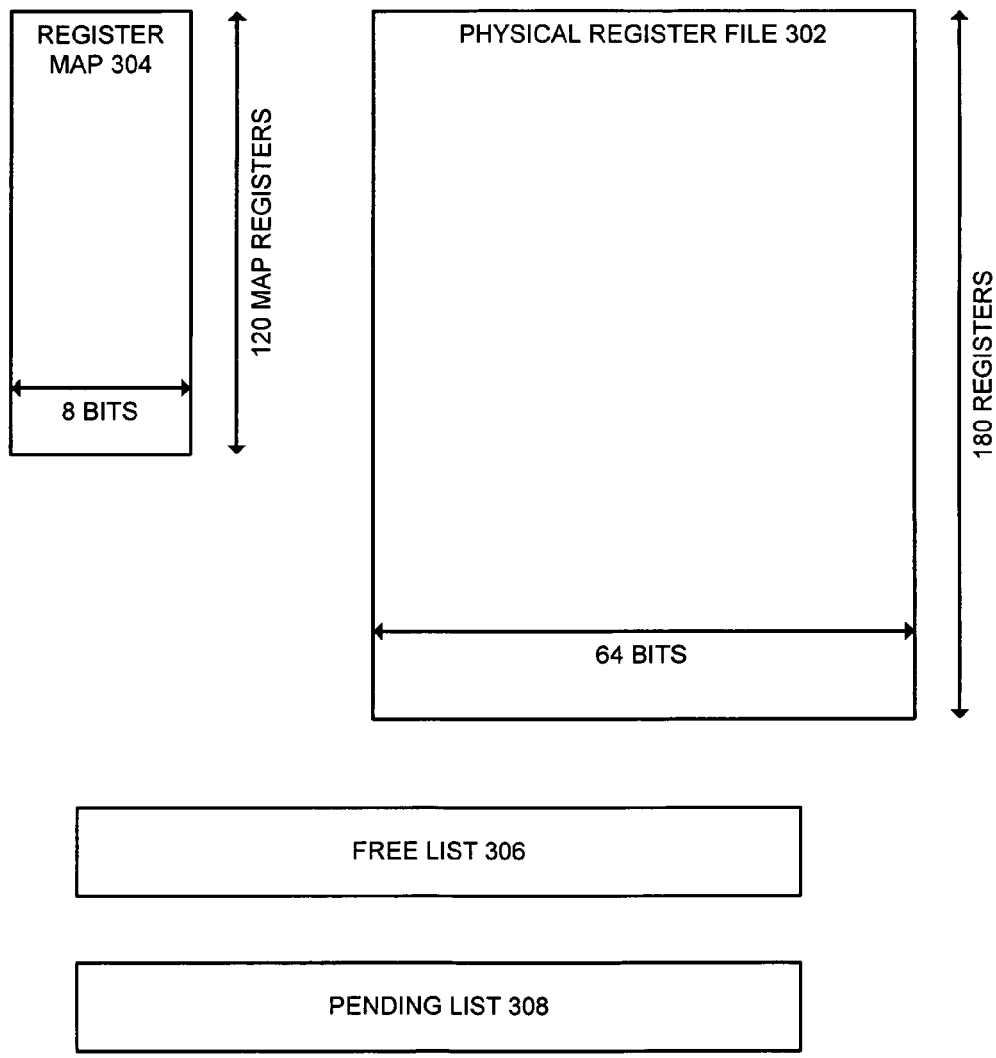
FIG. 3 illustrates data structures within the central processing unit in accordance with an embodiment of the present invention.

FIG. 3 illustrates data structures within CPU 100 in accordance with an embodiment of the present invention. These data structures include physical register file 302, register map 304, free list 306, and pending list 308.

Physical register file 302 includes the registers that are accessed by the execution units during instruction execution. Note that physical register file 302 can be any suitable width and depth. In one embodiment of the present invention, physical register file 302 is 64-bits wide and 180 registers deep.

Register map 304 includes pointers to registers within physical register file 302. These pointers associate the physical registers within physical register file 302 to the architectural registers within an executing program.

Free list 306 contains a list of unallocated registers within physical register file 302. Register file 116 accesses free list 306 to obtain a register from physical register file 302 to be mapped to an architectural register.

Pending list 308 maintains a list of allocated registers. When the register has been allocated, it is removed from free list 306 and is added to pending list 308. When a register is retired, the register is removed from pending list 308 and is returned to free list 306.

The system illustrated in FIG. 3 dynamically allocates space for register windows and in-flight operations in the physical register file. Note that the physical register file may accommodate a single register window with a large number of in-flight operations, say, in a high performance computing application, or alternatively, a larger number of windows with a few in-flight operations, say, in a highly sequential call-intensive application. Furthermore, the system dynamically manages the tradeoffs between using the physical register file to accommodate many windows each containing few live values per window or fewer windows with many live values.

In conventional register window management schemes, the save instruction allocates a window-sized chunk of physical registers. This strategy ensures that the system does not have to spill register windows except on save instructions. Further, the restore can easily recover a register-window sized chunk of physical registers. As described above, the drawback is that many of these allocated registers are not live at a call site, thereby increasing the number of window spills/fills as well as the number of registers spilled/filled on a window spill/fill.

In one embodiment of the present invention, a save creates a new name space but does not allocate physical registers. Physical registers are instead allocated in the rename stage for each destination register in an instruction. If the free list is empty, the processor may be forced to either stall till instructions retire and free up registers or may even be forced to spill a register window to create free physical registers. The system may choose to ensure that a certain number of physical registers (excluding those allocated for in-flight instructions) are always available so that the processor is not required to stall and window spill a register window, except under certain conditions such as renaming a save. This choice may decrease the utilization of the physical register file and consequently slightly increase the overall number of window spills. On the other hand, the processor design may be substantially simpler if window spills are guaranteed to occur only under limited conditions.

The maximum number of register windows supported is consequently not directly dependent on the size of the physical register file, but rather on the size of the rename map. Recall that the current window pointer and the register identifier are used to generate a flattened architectural register identifier. This identifier is used to index into the rename map to look up the associated physical register identifier. The size of the rename map is proportional to the product of the register window size and the maximum number of register windows supported. The number of registers in the physical register file is independent of the size of the rename map and also the maximum number of register windows that can be resident in the register file. In contrast, current implementations require the physical register file size to be larger than the architectural register file size, viz. the product of the register window size and the maximum number of register windows supported for a fixed register window size system.

In renaming a save instruction in the rename stage, if the number of resident register windows exceeds that supported by the rename map 114, the oldest window must be spilled. Similarly on renaming a restore instruction, if the rename map 114 does not map the resulting register window that is now architecturally visible, the system needs to fill this register window. However, not all registers in the window are spilled/filled on a save/restore. The rename map 114 keeps track of which architectural registers in a window are dead. The rename stage inserts helper instructions to save only those registers that are known not to be dead. On a window fill during a restore, only registers that are not dead have to be filled.

We now discuss techniques for identifying dead registers during a window spill and fill. A simple technique to track obviously dead registers is as follows. When a fresh window is created by a save instruction, all entries in the rename map 114 for that window are marked dead, say by ensuring that they do not point to a valid physical register or that they point to register 0 which is defined to always contain zero in the SPARC™ architecture. As instructions execute and define values for registers, some entries in the rename map 114 for that window now point to physical registers. Flattened architectural registers that are never defined still have their entries in the rename map 114 pointing to an invalid register or register zero. Thus, in this scheme, the system spills only registers that have been written into at least once.

A more sophisticated method for tracking dead registers involves providing the killreg instruction 130 as part of the SPARC™ instruction set architecture. Note that killreg instruction 130 is illustrated with a dashed line to indicate that killreg instruction 130 is not necessary for all embodiments of the present invention. A compiler examines all the possible paths of execution starting from, say, a call site and tracks which registers will never be read again before being written into. Since the values in these registers will never be read, these registers are dead and can be "killed" using the killreg instruction so that they need not be spilled/filled. Experiments establish that almost 75% of the registers are written into at least once but that only 25% of the registers are written into before a call site and are also read from after returning from the call. Thus, this killreg instruction together with sufficient compiler support can reduce the number of registers spilled by a factor of three over the simpler scheme.

In order to fill only those registers that have been spilled and reduce the cost of a register window fill, one embodiment of the present invention includes the following. The current software calling convention or application binary interface (ABI) allocates space on the stack for register window spills. This embodiment modifies the ABI to include a location for writing a live register bit vector whose size is equal to the maximum register window size, typically sixteen. On each window spill, the system writes out the live register bit vector location indicating which registers are live. On a subsequent window fill, the system first reads the live register bit vector and fills only those registers that are live.

If the costs of changing the ABI are too large, another embodiment of the present invention maintains a hardware stack of live register bit vectors (LRV). On each window spill the system pushes a new LRV representing the live registers in that window. On each window filling restore, the system pops an LRV indicating which registers need to be restored. If the call depth exceeds the hardware stack size, the system has to conservatively restore all registers when there is no LRV for a register window. Each process running on a processor has its own stack of LRVs. If the number of simultaneous processes exceeds a given limit, the system may remove one of the hardware stacks. In this case, when that process resumes execution, the system has to conservatively restore all registers from the window on each window fill. Similarly, when processes migrate between processors the system may have to conservatively fill all registers on each window fill.

The previous paragraph assumed hardware stacks of LRVs for register windows that are not resident, but the system can also maintain a hardware stack that is inclusive of the resident windows. For resident windows, the LRV indicates which registers are currently live. On each save, the system pushes an all-zero LRV on to the stack. On each definition, the system sets the corresponding bit on the top-of-stack bit pattern to one. On a killreg instruction, the system resets a subset of the bits to zero. On a restore, the system pops the top-of-stack LRV off of the stack. On a window spill, the system uses the LRV on the stack corresponding to the register window being spilled to control which registers are spilled. On a window fill, the system uses the LRV to control which registers are filled.

A restore instruction deallocates all physical registers allocated to the current register window from the physical register file. Similarly, a killreg deallocates some subset of the registers allocated to the current window from the physical register file. In either case, the registers may not be deallocated when the corresponding instruction enters the rename stage because there may be outstanding instructions that read from these registers. The registers may be deallocated when the restore or killreg itself retires, at which point all earlier instructions that potentially use these physical registers are guaranteed to have retired. Thus, a restore/killreg marks registers as dead in the rename map and/or hardware stack and pushes all these to-be-dead physical registers into the pending list. When the restore/killreg retires, these registers are moved from the pending list to the free list. The system uses existing superscalar mechanisms as much as possible. The primary difference for restore/killreg is that they move multiple registers from the pending to the free list at retire, as opposed to a single register for most other instructions. Therefore, retiring restore/killreg may require multiple cycles.

A variant of the dynamic register allocation scheme for windowed architectures is called "direct register allocation" because it skips the intermediate step of flattening a register identifier or current window pointer to a flattened architectural register. The system maintains a current rename map that maps all current architecturally visible registers to associated physical registers. In addition, the system has a hardware stack of rename maps, each corresponding to a register window. Each rename map renames only the architectural registers in a register window to associated physical registers. With overlapped register windowing, the current rename map is composed of two or more rename maps from the hardware stack. The system keeps only the current rename map continuously updated; the entire hardware rename stack is brought up to date only on a save/restore or a window spill/fill.

With direct register allocation, each instruction looks up the current rename map for the physical register identifiers for its source registers in the rename stage. The destination registers are assigned physical registers from the free list and the current rename map is updated to reflect this assignment. The current window pointer is encoded implicitly to the hardware rename stack and is not required for looking up or assigning a physical register for an instruction register identifier obtained from a bit field in the instruction. On a save, a new entry is pushed onto the hardware rename stack. The previous current rename map is used to update the new current rename map, say, by shifting it by the window offset, i.e. the number of registers shared between the caller and the callee.

On a restore, the top-of-stack is popped off the hardware rename stack and the current rename map is updated. A killreg marks certain mappings in the current rename map as invalid. On a window spill, the system uses the oldest entry in the hardware rename stack to spill registers. On a window fill, the system updates the rename map on the hardware stack by assigning physical registers for those architectural registers from that window that are filled. The extensions and enhancements described earlier for the scheme that requires flattening also apply for direct register allocation.

Executing a Save

FIG. 4 is a flowchart illustrating the process of executing a save operation in accordance with an embodiment of the present invention. The process starts when a register window allocation event is encountered, for example during a function call operation (step 402). Next, the system allocates a new name space for the register window (step 404). However, the system does not allocate any registers at this time, but instead waits to allocate registers until when they are needed.

Next, the system determines if there are sufficient registers available on the free list to fully populate the window (step 406). In one embodiment, the system determines if there are, for example, 16 registers available on the free list. If sufficient registers are not available on the free list, the system spills in-use registers from the oldest active window to memory to make more space on the free list (step 408). When sufficient registers are available on the free list, the system updates the current window pointer to point to the active register window (step 410). In another embodiment of the present invention, the system does not check if there are sufficient registers available, but instead determines if registers are available during subsequent register allocation operations.

Allocating Physical Registers

FIG. 5 is a flowchart illustrating the process of allocating a physical register in accordance with an embodiment of the present invention. The process starts when a system encounters a register allocation event during program execution (step 502). For example, the register allocation event can be triggered by a write to a register. Next, the system determines if a register is available on the free list (step 504). Note that in some embodiments this step is not necessary. If a full set of registers is ensured during the save operation, a register will always be available on the free list. Hence, it is not necessary to check if one is available. Note also that registers may be temporarily unavailable even if a full set of registers is ensured during the save operation, because the physical registers may be used by in-flight instructions as well. However, in this case, it is sufficient to just stall the rename unit until a sufficient number of instructions retire and then free up the physical registers.

If sufficient registers are not available in the free list, the system spills allocated registers from the oldest active window to memory (step 506). Finally, the system allocates a physical register from the free list (step 508).

Restoring a Register Window

Figure 6:
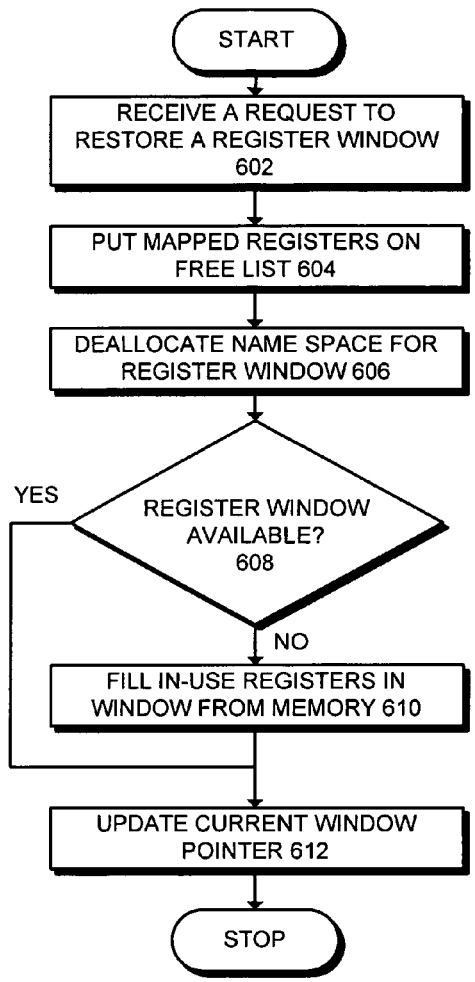
FIG. 6 is a flowchart illustrating the process of executing a restore operation in accordance with an embodiment of the present invention.

FIG. 6 is a flowchart illustrating the process of performing a restore operation to de-allocate a register window in accordance with an embodiment of the present invention. The system starts when a request is received to restore a register window (step 602). Next, the system removes the mapped registers from the pending list and adds them to the free list (step 604). The system then deallocates the name space for the register window (step 606).

After deallocating the name space, the system determines if a register window remains allocated to allow the program to continue executing (step 608). If not, the system fills the in-use registers with a window from memory (step 610). Note that these registers were moved to memory during a previous spill operation. Registers may be filled/spilled into the regular main memory of the system or to a special memory/buffer dedicated to holding spilled register windows. Finally, the system updates the current window pointer to point to the new active register window (step 612).

Deallocating Registers

Figure 7:
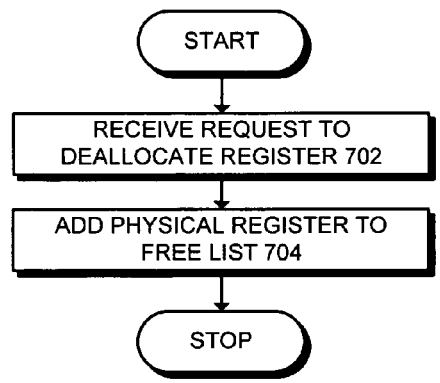
FIG. 7 is a flowchart illustrating the process of deallocating registers in accordance with an embodiment of the present invention.

FIG. 7 is a flowchart illustrating the process of deallocating registers in accordance with an embodiment of the present invention. The system starts when a request is received to deallocate a register (step 702). Note that the request may be received because the register is no longer needed or because a killreg command has been received. Finally, the register is moved from the pending list to the free list (step 704).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. An apparatus that dynamically allocates physical registers in a windowed processor architecture, comprising:
 a processor;
 a physical register file within the processor;
 a register map within the processor that is configured to map architectural registers defined within an executing program to physical registers within the physical register file; and
 a window allocation mechanism within the processor that is configured to allocate a new name space for a register window without allocating physical registers for the register window, thereby without checking if there are sufficient physical registers available;
 a register renaming mechanism within the processor that is configured to:
  allocate physical registers dynamically as needed instead of allocating all of the registers in a register window at register window initialization time, wherein allocating physical registers involves checking if there are sufficient registers available, and if necessary, to spill allocated registers to memory.

2. The apparatus of claim 1, further comprising an allocation mechanism that is configured to allocate a physical register within a register window in response to a triggering event.

3. The apparatus of claim 2, wherein the triggering event can include a write to any architectural register.

4. The apparatus of claim 1, further comprising a spill mechanism that is configured to spill allocated physical registers to memory from an oldest register window.

5. The apparatus of claim 1, further comprising a fill mechanism that is configured to fill registers from memory during a window underflow condition.

6. The apparatus of claim 1, further comprising:
a free list of registers, wherein the free list identifies available registers within the physical register file; and
a pending list, wherein the pending list identifies in-use registers within the physical register file, and wherein the pending list identifies registers that will be moved to the free list once all in-flight instructions using these registers have retired.

7. The apparatus of claim 6, further comprising a restore mechanism that is configured to:
remove mappings of physical registers within a current window; and to
add recovered physical registers to the free list.

8. The apparatus of claim 6, further comprising a retire mechanism that is configured to move a register from the pending list to the free list when the register is no longer needed by the executing program.

9. The apparatus of claim 1, further comprising a live register vector that is configured to indicate which registers are allocated.

10. The apparatus of claim 6, wherein the system is configured to execute a killreg instruction to remove mappings and to recover a physical register for a target register within a register window that is no longer live.

11. The apparatus of claim 1, further comprising a hardware stack of rename maps with the current rename map at the top of this stack used to directly translate architectural register identifiers to physical register identifiers.

12. The apparatus of claim 11, wherein the rename map stack is popped/pushed respectively on a window deallocation/allocation event and the previous top of rename stack is used to update the new top of rename stack appropriately.

13. A method for dynamically allocating physical registers in a windowed processor architecture that includes a physical register file and a register map that is configured to map architectural registers defined within an executing program to physical registers within the physical register file, the method comprising:
encountering a register window allocation event during execution of a program;
in response to the register window allocation event, a window allocation mechanism allocates a new name space for a register window without allocating physical registers for the register window, thereby without checking if there are sufficient physical registers available;
allocating physical registers dynamically as needed instead of allocating all of the registers in a register window at register window initialization time, wherein allocating physical registers involves checking if there are sufficient registers available; and
if necessary, spilling allocated registers to memory.

14. The method of claim 13, further comprising allocating a single physical register within a register window in response to a register allocation event.

15. The method of claim 14, wherein the register allocation event can include a write to an unallocated register.

16. The method of claim 13, further comprising spilling allocated physical registers to memory from an oldest register window, if necessary, to free up allocated physical registers.

17. The method of claim 13, further comprising filling a register window from memory during a window underflow condition.

18. The method of claim 13, further comprising:
maintaining a free list of registers, wherein the free list identifies available registers within the physical register file; and
maintaining a pending list, wherein the pending list identifies in-use registers within the physical register file.

19. The method of claim 18, further comprising restoring allocated registers when necessary by:
removing mappings of physical registers within a current window; and
adding recovered physical registers to the free list.

20. The method of claim 18, further comprising retiring a register when the register is no longer needed by the executing program to move a register from the pending list to the free list.

21. The method of claim 13, further comprising maintaining a live register vector that is configured to indicate which registers are allocated.

22. The method of claim 18, further comprising:
receiving a killreg instruction during execution of a program for a target register within a register window that is no longer live; and
executing the killreg instruction to remove mappings and to recover a physical register for the target register.

23. The method of claim 13, further comprising using a hardware stack of rename maps with the current rename map at the top of this stack to directly translate architectural register identifiers to physical register identifiers.

24. The method of claim 23, wherein the rename map stack is popped/pushed respectively on a window deallocation/allocation event and the previous top of rename stack is used to update the new top of rename stack appropriately.

25. A computer system that dynamically allocates physical registers in a windowed processor architecture, comprising:
a processor;
a memory;
a physical register file within the processor;
a register map within the processor that is configured to map architectural registers defined within an executing program to physical registers within the physical register file;
a window allocation mechanism within the processor that is configured to allocate a new name space for a register window without allocating physical registers for the register window, thereby without checking if there are sufficient physical registers available;
allocating physical registers dynamically as needed instead of allocating all of the registers in a register window at register window initialization time, wherein allocating physical registers involves checking if there are sufficient registers available; and
if necessary, spilling allocated registers to memory.

* * * * *